Jan. 12, 1971   A. VON LÖWIS OF MENAR   3,554,614
HYDRAULIC BRAKING ARRANGEMENT
Filed June 24, 1969   2 Sheets-Sheet 2
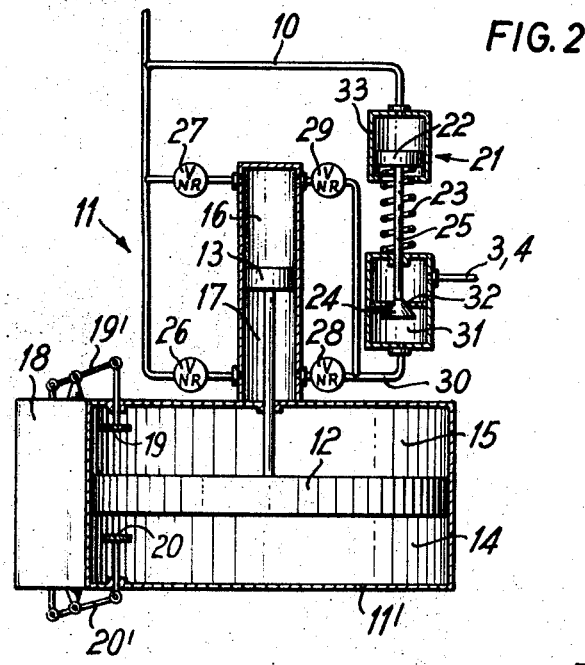
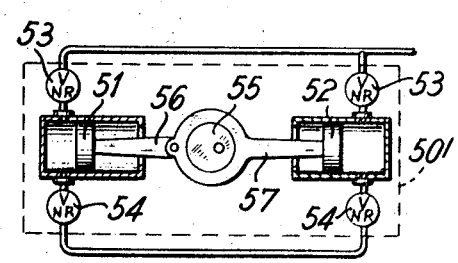
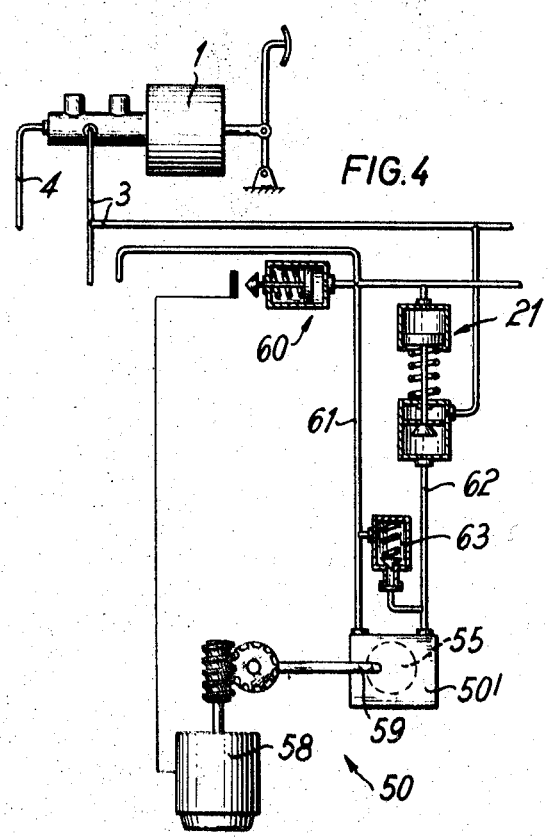
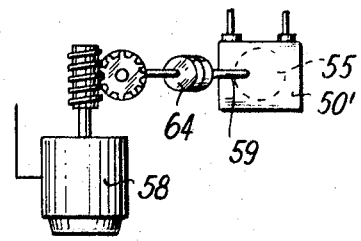
INVENTOR:
Alexander von LÖWIS
BY
his ATTORNEY United States Patent Office 3,554,614
Patented Jan. 12, 1971

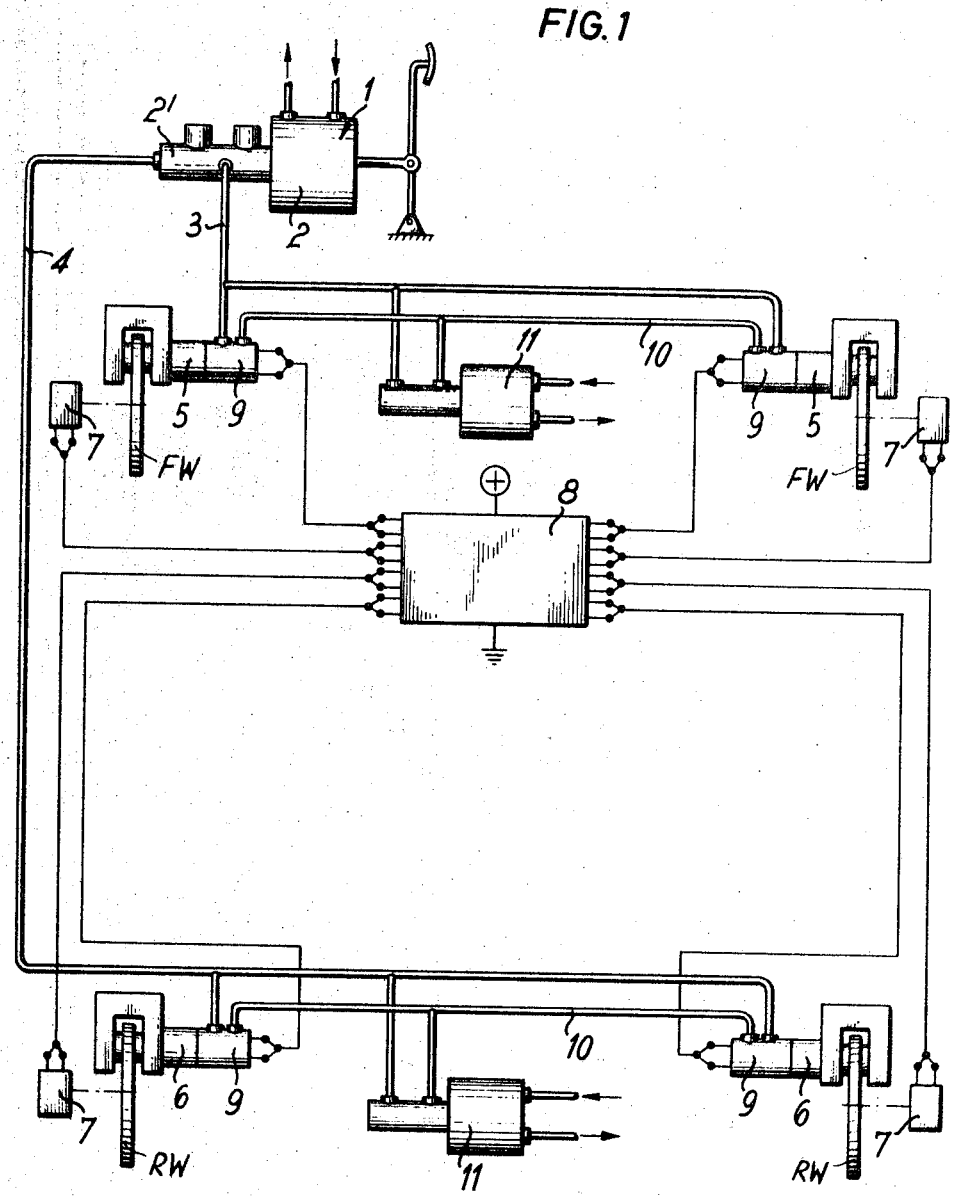

3,554,614
HYDRAULIC BRAKING ARRANGEMENT
Alexander von Löwis of Menar, Mauren, Germany, assignor to Robert Bosch G.m.b.H., Stuttgart, Germany
Filed June 24, 1969, Ser. No. 836,079
Claims priority, application Germany, July 17, 1968,
1,755,965
Int. Cl. B60t 8/02
U.S. Cl. 303—21   12 Claims

ABSTRACT OF THE DISCLOSURE

A hydraulic braking arrangement for vehicle wheels in which a feeler senses retardation of the wheel during braking to disconnect during excessive retardation of the wheel the brake cylinder from a conduit which feeds pressure fluid into the brake cylinder and to connect the latter to a relief conduit, and in which fluid return means return pressure fluid from the relief conduit to the conduit for feeding pressure fluid into the brake cylinder to assure prompt action of the latter during the next braking step.

BACKGROUND OF THE INVENTION

A brake system is already known in which during actuation of the brake by the driver a force is applied which counteracts the braking force initiated by the driver when the wheel braked by the driver-actuated braking force is nearly blocked so that the force applied to the brake is reduced in such a manner that the vehicle wheel during full actuation of the brake is retained just at the border of being blocked without being actually fully blocked. In this way the maximum possible braking force is transmitted to the road.

Another possibility to prevent complete blocking of the wheel during braking is to discharge, by hydraulic brakes, braking fluid from the brake cylinder which applies a braking action to the wheel at a moment before the wheel becomes completely blocked to thus reduce the braking force to the desired value. Such action preferably proceeds in a pulsating manner since the feeler sensing the retardation of the wheel will continuously act in dependence on the changing retardation thereof.

In such an arrangement further feeding of pressure fluid into the brake-actuating cylinder of the wheel is interrupted by a valve when the wheel reaches the complete blocking position and the valve permits at the same time outflow of braking fluid from the brake cylinder. The outflowing brake fluid is usually passed into the pressureless storage container of the main cylinder. This action is cancelled after the braking force has been reduced to a predetermined value, which corresponds to a reduced retardation of the wheel, so that by a continuous activation and deactivation of the blocking prevention device a complete blocking of the wheel will be prevented.

It is, however, a decisive disadvantage of the aforementioned system that the available brake fluid will be exhausted during such braking in a very short time since during actuation of the blocking-prevention device brake fluid is discharged from the brake cylinder, while during deactivation of the device no brake fluid is returned as long as the driver actuates the brake.

To avoid this disadvantage it is already known to provide a device which deactivates the blocking-prevention device upon reaching of a predetermined maximum stroke of the brake pedal. This arrangement does however not work properly under all operating conditions. It necessitates repeated actuation of the brake pedal in order to assure a continuous operation of the blocking prevention device.

Finally, it is also known to pump back the brake fluid discharged from the brake cylinder by means of a pump into the conduit which feeds the fluid into the brake cylinder. However, a pump constitutes usually a relatively sluggish operating system so that the danger exists that the valve which controls discharge of brake fluid from the brake cylinder as well as the pressure in the conduit which feeds brake fluid into the brake cylinder will be detrimentally influenced by the pump.

SUMMARY OF THE INVENTION

It is an object of the present invention to overcome the above-mentioned disadvantages of hydraulic braking arrangements known in the art and to provide for a blocking-preventing hydraulic braking system which will not be exhausted and which will operate quickly and reliably.

With these and other objects in view, the hydraulic braking arrangement according to the present invention, especially for vehicle wheels, mainly comprises a main cylinder, at least one brake cylinder, a brake fluid conduit connecting the main cylinder with the brake cylinder, a relief conduit, control means for disconnecting the brake cylinder from the brake fluid conduit and for connecting the latter to a relief conduit and comprising a control valve in the conduits and feeler means cooperating with the wheel to be braked for actuating the control valve during excessive retardation of the wheel, fluid return means having at least one fluid filled working space, a second control valve connecting the working space with the brake fluid conduit and actuating means connected to the second control valve for actuating the latter in dependence on the pressure in the relief conduit in such a manner so as to establish connection between the working space and the brake fluid conduit when the pressure in the relief conduit rises beyond a predetermined pressure and to interrupt the connection when the pressure in the relief conduit drops below the predetermined pressure, and means for maintaining the fluid in the aforementioned working space constantly under pressure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic illustration of the braking arrangement according to the present invention;

FIG. 2 is a schematic illustration of one embodiment of the fluid return means of the hydraulic braking arrangement;

FIG. 3 is a schematic illustration of a second embodiment of such fluid return means;

FIG. 4 is a schematic partial illustration of a hydraulic braking arrangement using the fluid return means as shown in FIG. 3; and FIG. 4a is a partial illustration of a modification of the arrangement illustrated in FIG. 4.

DESCRIPTION OF THE PREFERRED EMBODIMENTS

The hydraulic braking arrangement illustrated in FIG. 1 comprises a foot pedal actuated main or master cylinder 1 provided with an amplifier 2 and a hydraulic tandem cylinder 2′ connected to the amplifier. The main cylinder 1 transmits brake fluid through the brake fluid conduit 3 to the front wheel brake circuit and through a brake fluid conduit 4 to the rear wheel brake circuit. A brake cylinder 5 is provided on each of the front wheels FW and a brake cylinder 6 is provided at each of the rear wheels RW, which brake cylinders respectively act over braking discs on the respective vehicle wheels. A feeler 7 of known construction, not forming part of the present invention, is arranged at each of the vehicle wheels for sensing the retardation thereof during braking of the wheel. Each feeler 7 is connected by means of an electrical conductor to a common computer 8. A magnet-operated valve 9 for each of the brake cylinders 5 and 6 is connected to the computer 8 and the magnet-operated valves 9 are arranged closely adjacent to the respective brake cylinder 5 or 6. Each of the valves 9 controls flow of fluid through a relief conduit 10 to a fluid return means 11, one of which is provided for each of the axles of the vehicle.

As shown in FIG. 2 the fluid return means 11 comprises a feed pump including a cylinder means and a piston means 13 reciprocably arranged in the cylinder means and forming in the latter two working spaces 16 and 17. The piston 13 of the feed pump is connected by a piston rod with a drive piston 12 reciprocably arranged in a cylinder 11' and dividing the interior of the latter into the spaces 14 and 15 which, by means of a reversing valve 18, fixed to the cylinder 11' are alternately connected, for instance, to atmospheric pressure and to a source for creating subatmospheric pressure. The reversing valve 18 is actuated by a pair of actuating elements 19, 20 respectively extending into the spaces 14 and 15 and connected to the reversing valve by lever means 19' and 20' in such a manner that the drive piston 12 engaging in one end position thereof one or the other of the actuating elements to thus reverse the position of the reversing valve. The two working spaces 16 and 17 located on opposite sides of the piston 13 are respectively connected by a pair of one-way valves 26 and 27 to the relief conduit 10 and by an additional pair of one-way valves 28 and 29 to a control valve 21.

The control valve 21 comprises a valve seat 32, and a valve member 24 cooperating with the valve seat 32 to control flow of pressure fluid from a space 31 connected by a conduit 30 to the one-way valves 28 and 29 to the brake fluid conduits 3, 4 respectively. Actuating means comprising a control cylinder 33 communicating at one end thereof with the relief conduit 10, a control piston 22 reciprocably arranged in the control cylinder 33 and biasing means in form of a spring 23 biasing the piston 22 toward the aforementioned end of the cylinder 33 and a connecting rod 25 connecting the control piston 22 with the valve member 24 are provided for moving the valve member 24 between an open position and a closed position.

The above-described hydraulic braking arrangement will operate as follows:

During actuation of the brake pedal, the brake cylinders 5 and 6 are supplied in known manner with brake fluid whereby the brakes connected to the brake cylinders are actuated. When one of the wheels becomes blocked under the braking force applied thereto, the respective feeler 7 produces through the computer 8 an electrical signal actuating the electromagnet operated valve 9 in such a manner to interrupt the connection between the main cylinder 1 and the respective brake cylinder and to connect the brake cylinder with the respective relief conduit 10. The relief conduit 10 does however not lead to the storage container of the main cylinder, but to the fluid-return means 11 and the latter pumps in the manner, as will be described below, the brake fluid discharged from the brake cylinder back into the brake fluid conduit 3, respectively 4.

As mentioned above, the spaces 14 and 15 of the cylinder 11' are alternatingly connected to the outer atmosphere and to a source producing a subatmospheric pressure. This connection is controlled by the reversing valve 18 via the actuating elements extending from opposite ends in the cylinder 11' and the lever means 19' and 20' connecting the actuating elements to the reversing valve 18. If for instances the upper space 15 is connected with the outer atmosphere, while the lower space 14 is connected to the means for producing a subatmospheric pressure, then the drive piston 12 tends to move in downward direction. The piston 13 connected to the drive piston 12 exerts thereby pressure on the fluid filling the working space 17. The two pistons 12 and 13 can however not move as long as the valve member 24 engages its valve seat and thereby prevents flow of fluid from the working space 17 into the brake fluid conduit 3 or 4 since escape of fluid from the space 17 into the relief conduit is prevented by the one-way valve 26. Only when during blocking of a wheel the pressure in the relief conduit 10 increases and this pressure increase is transmitted into the control cylinder 33 to move the control piston 22 reciprocable therein against the force of the spring 23 in downward direction to thereby disengage the valve member 24 from its seat 32, fluid will pass from the working space 17 through the one-way valve 28, the conduit 30 into the space 31, and through the opened valve into the respective brake fluid conduit so that the pistons 13 and 12 may move in downward direction, causing thereby the piston 13 to press fluid in the working space 17 in the aforementioned manner into the respective brake fluid conduit 3 or 4. At the same time fluid will also enter through the one-way valve 27 from the relief conduit 10 into the working space 16, which therefore acts as a suction space of the pump.

When blocking of the respective vehicle wheel stops, the pressure in the relief conduit drops so that the force of the return spring 23 may move the control piston 22 in upward direction, causing thereby re-engagement of the valve member 24 with its valve seat 32 and to thus stop further movement of the pistons 12 and 13. During blocking and releasing of the respective brake, the stepwise movement of the pistons 12 and 13 in downward direction is repeated until the pistons 12 and 13 reach their lowermost positions. In the lowermost position of the drive piston 12, the latter actuates the reversing valve 18 in such a manner as to now connect the space 14 with the outer atmosphere and the space 15 with the source for producing subatmospheric pressure. After this reversing of the reversing valve, the pistons 12 and 13 tend to move in upward direction. If the blocking protection device is again actuated, the working space 17, which acted before as pressure or delivery space, will now act as suction space of the return pump. Pressure fluid will, when the valve member 24 is moved away from its valve seat, be sucked through the one-way valve 26 from the relief conduit 10 into the working space 17 and at the same time pressure fluid in the working space 16, which acts now as delivery or pressure space of the pump, will be discharged through the one-way valve 29 and the opened control valve into the brake fluid conduit 3, respectively 4. When now the piston 12 reaches its upper end position, it will actuate the lever means 19' to thereby reverse the position of the reversing valve 18 so that the latter will connect again the space 15 with the outer atmosphere and the lower space 16 with the source of vacuum. The movement of the pistons 12, 13 will occur then again in downward direction.

The speed at which the pistons 12 and 13 can move will depend on the amount of pressure fluid discharged after each blocking of the brake from the respective brake cylinder and from the size of the pump. When the blocking protection device operates for instance with a frequency of 100 Hz., then the pump will also be actuated and deactuated with the same frequency. The piston 13 of the pump will be moved stepwise with aforementioned frequency in upward or downward direction to feed during such movement brake fluid back into the brake fluid conduit and the piston will remain at standstill when the blocking protection device is not actuated.

The control piston 22 can move in downward direction in the control cylinder 33 through a distance greater than necessary to disengage the valve member 24 from its valve seat 32 so that during such downward movement of the control piston a relatively large amount of pressure fluid will be sucked from the relief conduit 10 into the cylinder 33. This provision is made in order to relieve the relief conduit 10 from quick pressure impulses occurring therein. The control valve 21 is according to a feature of the present invention arranged closely adjacent to the brake cylinders 5 and 6, respectively. This will assure that the mentioned pressure impulses need not to move the whole liquid column between the brake cylinders 5 or 6 and the fluid-return means 11.

The above-described operation will assure that even during discharge of relatively large amounts of pressure fluid from the brake cylinder during actuation of the blocking protection device, sufficient and instantaneously available brake fluid will remain in the brake conduits 3 and 4 so that the brake will properly operate and not become exhausted.

The above-described arrangement may obviously be modified by alternatingly connecting the spaces 14 and 15 of the cylinder 11' to the outer atmosphere and to a source of compressed air.

A modification of the above-described arrangement is illustrated in FIGS. 3 and 4. This modification is especially suitable for vehicles which are not provided with a source of compressed air or a source for producing subatmospheric pressure. FIG. 3 schematically illustrates a different pump for the fluid return means. As shown in FIG. 3, the fluid-return pump 50' comprises two separate pumping cylinders in which the pumping pistons 51 and 52 are respectively reciprocable and in which the spaces of the cylinders which face away from each other are respectively connected by one-way valves 53 and 54 to the relief conduit 61 and to a conduit 62 which connects the aforementioned spaces to the control valve 21 as shown in FIG. 4. The pistons 51 and 52 are driven by an eccentric 55 connected by means of rods 56 and 57 with the pistons 51 and 52.

As drive for the fluid-return pump 50' serves, as shown in FIG. 4, an electromotor 58 which is connected by means of a reduction gear arrangement to the shaft 59 which carries the eccentric 55. The whole fluid-return means is designated in FIG. 4 with the reference numeral 50. A fluid pressure actuated switch 60 connected to the fluid circuit shown in FIG. 4 serves to connect the motor 58 to the electric network and to disconnect it therefrom. Between the relief conduit 61, which corresponds to the relief conduit 10 shown in FIGS. 1 and 2, and the conduit 62, which corresponds to the conduit 30 shown in FIG. 2, there is arranged an overpressure release valve 63 opening into the conduit 61 through which an excess of pressure fluid pumped by the return pump 50' may be returned into the relief conduit 61. The overpressure valve 63 may be replaced by another device, for instance by a strictly mechanical device such as a slip clutch 64 in the shaft 59 as shown in FIG. 4a. The control valve 21 shown in FIG. 4 is the same as that illustrated and described in connection with FIG. 2, and it is to be understood that the arrangement only partly shown in FIG. 4 includes otherwise all elements as shown in FIG. 1.

The modification illustrated in FIGS. 3 and 4 will operate substantially in the same manner as the arrangement described above in connection with FIG. 2. The fluid-return pump 50' is actuated by the switch 60 only when a predetermined pressure is reached or surpassed in the relief conduit 61. The other elements of the arrangement shown in FIGS. 3 and 4 will be actuated in the same manner as described above in connection with FIG. 2. By properly adjusting the pressures at which the switch 60, the control valve 21 and the overpressure valve 63 will be actuated, the arrangement illustrated in FIGS. 3 and 4 will also assure that the pressure in the conduit 62, which is connected via the control valve 21 to the brake fluid conduits 3 or 4, will always be properly maintained to quickly return pressure fluid into the brake fluid conduits whenever brake fluid is discharged from the brake cylinders during actuation of the blocking protection device. In the time intervals between such actuation no energy is used up by the fluid-return pump.

It will be understood that each of the elements described above, or two or more together, may also find a useful application in other types of hydraulic braking arrangements differing from the types described above.

While the invention has been illustrated and described as embodied in a hydraulic braking arrangement, it is not intended to be limited to the details shown, since various modifications and structural changes may be made without departing in any way from the spirit of the present invention.

What is claimed as new and desired to be protected by Letters Patent is set forth in the appended claims:

1. Hydraulic braking arrangement, especially for vehicle wheels, comprising, in combination, a main cylinder; at least one brake cylinder; a brake fluid conduit connecting said main cylinder with said brake cylinder; a relief conduit; control means for disconnecting said brake cylinder from said brake fluid conduit and for connecting said latter to said relief conduit and comprising a control valve in said conduits and feeler means cooperating with the wheel to be braked for actuating said control valve during excessive retardation of said wheel; and fluid return means having at least one fluid-filled working space, a second control valve connecting said working space with said brake fluid conduit, actuating means connected to said second control valve for actuating the latter in dependence on the pressure in said relief conduit in such a manner so as to establish connection between said working space and said brake fluid conduit when the pressure in said relief conduit rises beyond a predetermined pressure and to interrupt said connection when the pressure in said relief conduit drops below said predetermined pressure, and means for maintaining the fluid in said working space constantly under pressure.

2. An arrangement as defined in claim 1, wherein said fluid return means comprises a feed pump including cylinder means, piston means reciprocably arranged in said cylinder means and dividing the latter into two working spaces, and means connecting said working spaces to said relief conduit and said second control valve in such a manner that, during reciprocation of said piston means, one of said working spaces will act as suction space and the other as delivery space and vice versa, and wherein said means for maintaining the fluid in said delivery space under pressure comprises means for reciprocating said piston means in said cylinder means.

3. An arraangement as defined in claim 1, wherein said actuating means comprise a control cylinder communicating at one end thereof with said relief conduit, a control piston movable in said control cylinder and connected to said second control valve, and biasing means biasing said control piston towards said one end of said control cylinder to yieldably hold said control piston in a position in which said second control valve connected thereto interrupts the connection between said working space and said brake fluid conduit.

4. An arrangement as defined in claim 3, wherein said control piston is movable away from said one end of said control cylinder beyond a distance necessary to open said second control valve to thereby receive a predetermined amount of fluid from said relief conduit.

5. An arrangement as defined in claim 2, wherein said means connecting said working spaces to said relief conduit and to said second control valve comprise a first pair of one-way valves between said relief conduit and said working spaces, respectively, and a second pair of one-way valves between said working spaces and said second pair of valves, all of said one-way valves being arranged to permit flow of fluid only from said relief conduit to said control valve.

6. An arrangement as defined in claim 1, wherein said second control valve is arranged adjacent the brake cylinder coordinated therewith.

7. An arrangement as defined in claim 2, wherein said reciprocating means comprises a cylinder, a drive piston reciporacble in said cylinder and connected to said piston means, and reversing valve means actuated by said drive means in dependence on the position thereof in said cylinder to alternatingly feed a gaseous pressure medium to opposite sides of said drive piston into said cylinder to thereby reciprocate said drive piston and said piston means connected thereto.

8. An arrangement as defined in claim 7, wherein said reversing valve comprises a pair of actuating elements respectively engaged by said drive piston when the latter reaches opposite end positions in said cylinder to cause in each of said end positions reversal of movement of said drive piston and said piston means connected thereto.

9. An arrangement as defined in claim 2, wherein said reciprocating means comprises an electric motor and mechanical means connecting said motor to said piston means for reciprocating the latter.

10. An arrangement as defined in claim 9, and including a slip clutch in said mechanical connecting means.

11. An arrangement as defined in claim 9, and including an overpressure relief valve between said cylinder means of said pump and said relief conduit.

12. An arrangement as defined in claim 9, and including switch means for connecting and disconnecting said electric motor to and from a current supply, and switch actuating means controlled by the pressure in said relief conduit for connecting said motor to said current supply when the pressure in said relief conduit surpasses said predetermined pressure.

References Cited
UNITED STATES PATENTS

| | | | |
|---|---|---|---|
| 3,124,220 | 3/1964 | Kell | 303—21X |
| 3,276,822 | 10/1966 | Lister et al. | 303—21UX |
| 3,494,670 | 2/1970 | Leiber | 303—21 |
| 3,498,683 | 3/1970 | Leiber | 303—21 |

MILTON BUCHLER, Primary Examiner

JOHN J. McLAUGHLIN, Jr., Assistant Examiner

U.S. Cl. X.R.

188—181; 303—6, 10, 61